United States Patent
Tanaka et al.

(10) Patent No.: US 7,442,013 B2
(45) Date of Patent: Oct. 28, 2008

(54) ELECTRO-HYDRAULIC POWER STEERING APPARATUS

(75) Inventors: Toshinori Tanaka, Tokyo (JP);
Kiyohide Okamoto, Tokyo (JP);
Yuusuke Matsui, Tokyo (JP); Kyouhei Yamamoto, Tokyo (JP); Shuji Isono, Tokyo (JP); Hideki Megata, Tokyo (JP); Keiichi Fukazawa, Tokyo (JP); Katsumi Ohata, Tokyo (JP); Kengo Fujimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 595 days.

(21) Appl. No.: 10/790,123

(22) Filed: Mar. 2, 2004

(65) Prior Publication Data

US 2004/0202555 A1    Oct. 14, 2004

(30) Foreign Application Priority Data

Apr. 11, 2003    (JP)    ............................ P.2003-107749

(51) Int. Cl.
*B67D 5/40*    (2006.01)
(52) U.S. Cl. ..................................... 417/360
(58) Field of Classification Search .................. 417/360, 417/423.15, 423.14, 423.1, 423.7
See application file for complete search history.

(56) References Cited

U.S. PATENT DOCUMENTS

| | | | |
|---|---|---|---|
| 2,887,062 A * | 5/1959 | Cametti et al. .............. | 417/357 |
| 4,324,532 A * | 4/1982 | Knife .......................... | 417/360 |
| 5,360,322 A | 11/1994 | Henein et al. | |
| 5,590,732 A * | 1/1997 | Sugino et al. ............... | 180/444 |
| 5,868,175 A * | 2/1999 | Duff et al. .................... | 141/59 |
| 6,020,667 A * | 2/2000 | Carey et al. ................. | 310/216 |
| 2001/0033113 A1 | 10/2001 | Takano | |

FOREIGN PATENT DOCUMENTS

| | | |
|---|---|---|
| DE | 42 31 784 A1 | 3/1994 |
| DE | 198 59 340 A1 | 7/2000 |
| EP | 0 987 439 A2 * | 3/2000 |
| JP | 62-108663 U | 7/1987 |
| JP | 11-37074 | 2/1999 |
| JP | 11-294345 A | 10/1999 |
| JP | 2000-154791 A | 6/2000 |

* cited by examiner

*Primary Examiner*—Devon Kramer
*Assistant Examiner*—Vikansha Dwivedi
(74) *Attorney, Agent, or Firm*—Sughrue Mion, PLLC

(57) ABSTRACT

An electro-hydraulic power steering apparatus in which a control device, a motor and a pump are integrated. The apparatus includes a first housing, a second housing, a control device surrounded by the first and second housings, a motor disposed on a side of the first housing and a pump disposed on a side of the second housing. The motor includes a rotor, a stator and a frame. The rotor has a first bearing supported by the first housing. The frame includes an inner circumferential face into which a stator core is press fitted and receives a second bearing of the rotor. The frame is secured to the first housing by a first clamp screw. The first housing and the second housing are secured by a second clamp screw. The first and second clamp screws are tightened from the hand of the frame.

11 Claims, 7 Drawing Sheets

US 7,442,013 B2

ELECTRO-HYDRAULIC POWER STEERING APPARATUS

BACKGROUND OF THE INVENTION

1. Field of the Invention

The present invention relates to an electro-hydraulic power steering apparatus formed integrally of a motor, a hydraulic pump driven by the motor, and a control device for controlling the motor.

2. Background Art

In the conventional electric pump, an electric motor is screwed coaxially with a bracket by inserting a plurality of securing bolts circumferentially into a mounting flange circumferentially provided on one side, and engaging them into the tapped holes formed on the lateral face on the other side of the bracket. By this fastening, a motor shaft serving as an output shaft of the electric motor is contacted with a pump shaft in a shaft center portion of the bracket, and coaxially connected by the coupling (e.g., refer to JP-A-2000-154791, paragraph [0030], FIG. 1)

In the conventional electric pump, a frame making up an outer shell of the electric motor was formed of die-cast aluminum, an iron core of a stator for the electric motor was press fit into an inner circumferential face of the frame, and the frame was screwed into a bracket on the pump from the hand of the frame (e.g., by six screws). Also, a bearing on the pump rotatably bearing a rotor of the electric motor is supported by an intermediate bracket that is a separate component from the frame, and the intermediate bracket is screwed into the frame from the hand of the pump (e.g., by four screws).

In the conventional apparatus as constituted in the above manner, the frame was screwed into the bracket on the pump from the hand of the frame, and the intermediate bracket was screwed into the frame from the hand of the pump, whereby right hand and left hand ways of screwing were required (i.e., clockwise and counterclockwise directions), resulting in a problem that the electric motor was assembled with difficulties. Also, since the iron core made of iron was press fit into the frame made of aluminum, the press fit iron core might be shaky due to a difference in the thermal expansion coefficient between the frame and the iron core. If the press fit interference was increased to prevent the shakiness, a greater residual stress was caused by press fitting, resulting in a problem that the motor performance was degraded. Also, since the mounting flange provided circumferentially on one side was formed integrally with the frame made of aluminum, no abutment face existed between the frame and the mounting flange, taking effect to reduce the water proofing portion. However, since the frame was made of aluminum, the outer shell was increased in size, resulting in a problem that the mounting was worsen.

SUMMARY OF THE INVENTION

This invention has been achieved to solve the above-mentioned problems, and it is an object of the invention to provide an electro-hydraulic power steering apparatus in which the assembling of the apparatus is superior, the stator of the motor is securely fixed, the water proofing is excellent, the motor performance is high, the size is small, and the motor, the control device and the pump are integrated.

To achieve the object, the invention provides an electro-hydraulic power steering apparatus including: a first housing having a support portion; a second housing fixed to the first housing; a control device disposed in a space surrounded by the one side of the first housing and the one side of the second housing; a motor; and a pump. The motor is disposed on the other side of the first housing. The motor includes a rotor, a stator and a frame. The rotor has a first bearing and a second bearing. The stator has an iron core. The frame is made of iron and makes up an outer shell of the motor. The frame includes an inner circumferential face into which the iron core is press fitted and a receiving portion which receives the second bearing. The pump is disposed on the other side of the second housing. The frame is secured to the first housing by a first clamp screw. The first housing and the second housing are secured by a second clamp screw. The control device, the motor and the pump are integrated. The first clamp screw and the second clamp screw are tightened from the hand of the frame.

BRIEF DESCRIPTION OF THE DRAWINGS

The present invention may be more readily described with reference to the accompanying drawings.

DETAILED DESCRIPTION OF THE PREFERRED EMBODIMENTS

Embodiment 1

Figure 1:
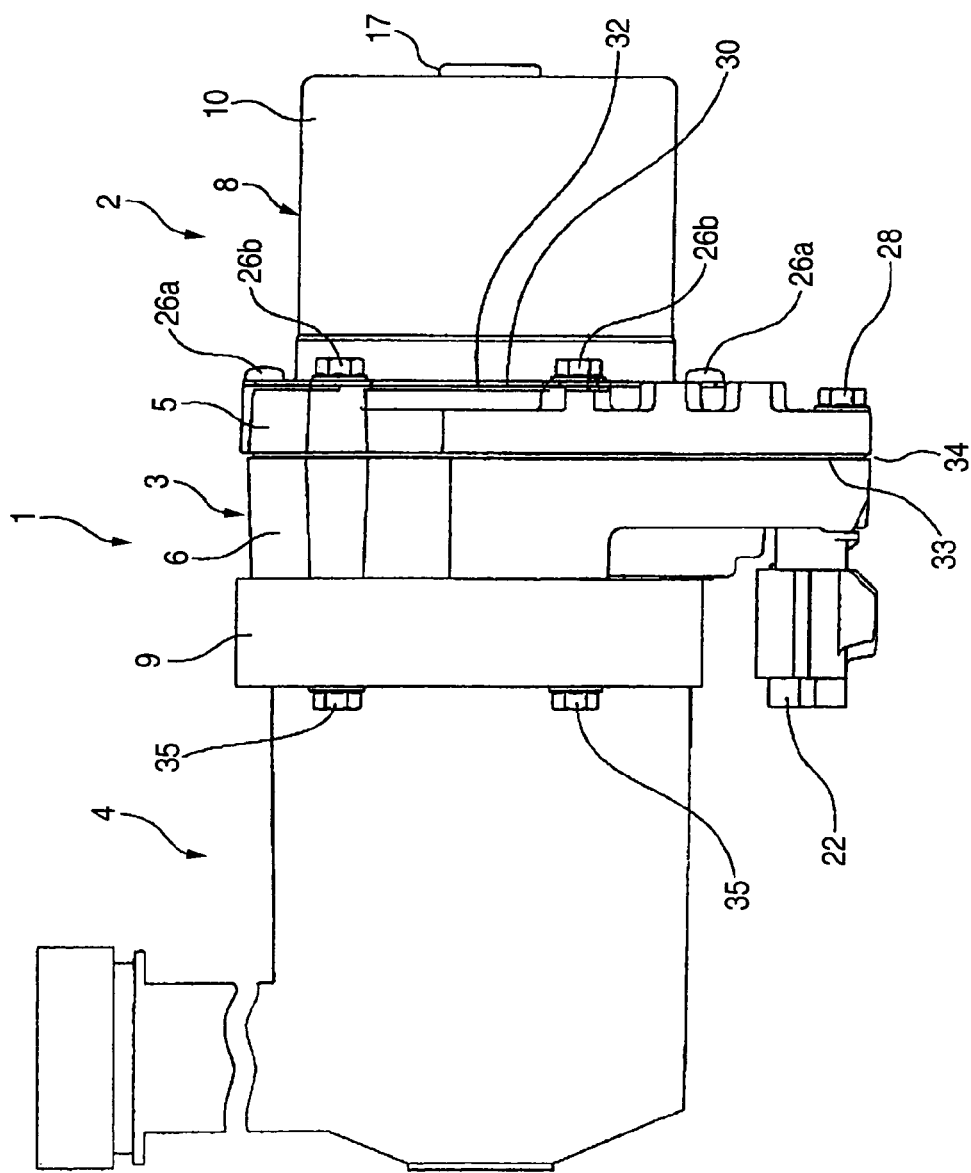
FIG. 1 is a front view showing an electro-hydraulic power steering apparatus according to an embodiment 1 of the present invention.
Figure 2:
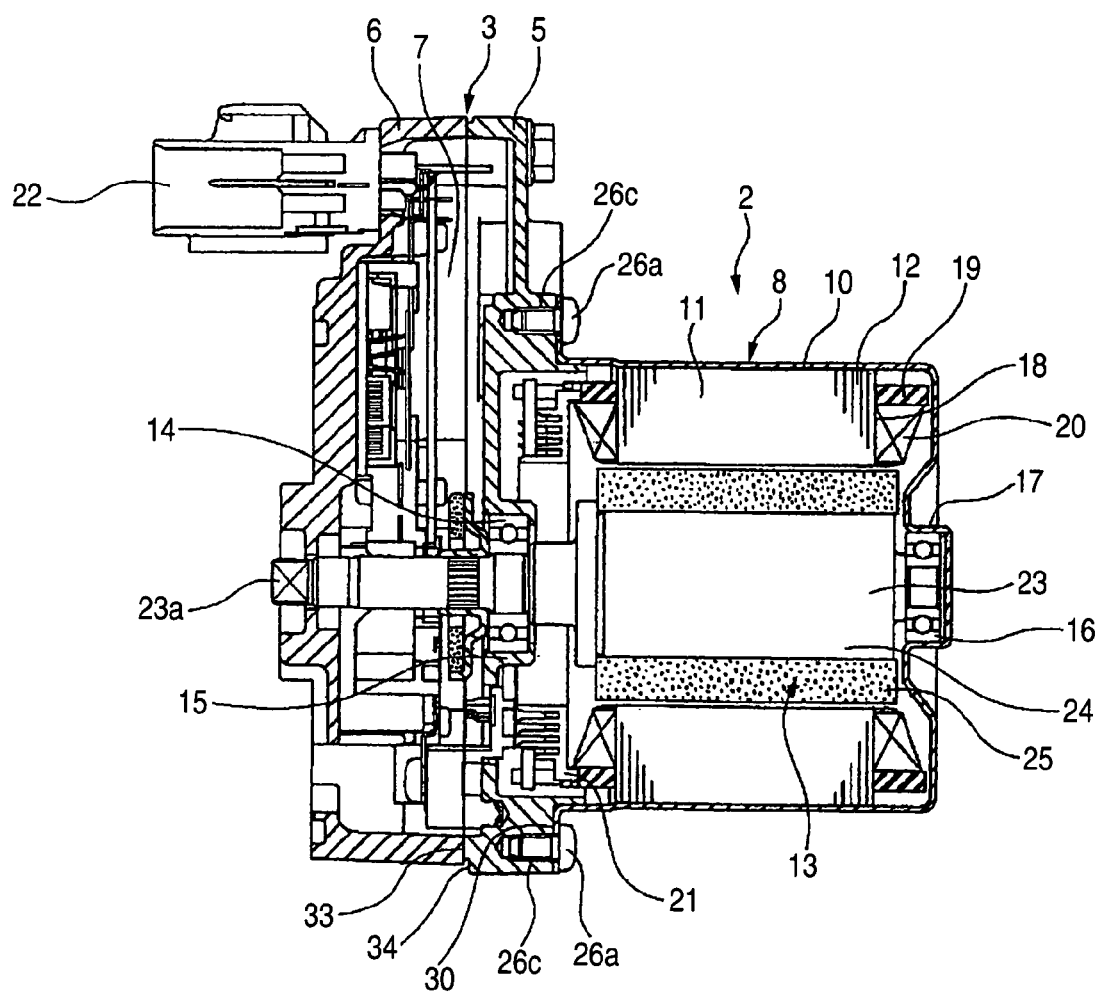
FIG. 2 is a cross-sectional view showing a motor portion and a control device portion according to the embodiment 1 of the invention.
Figure 3:
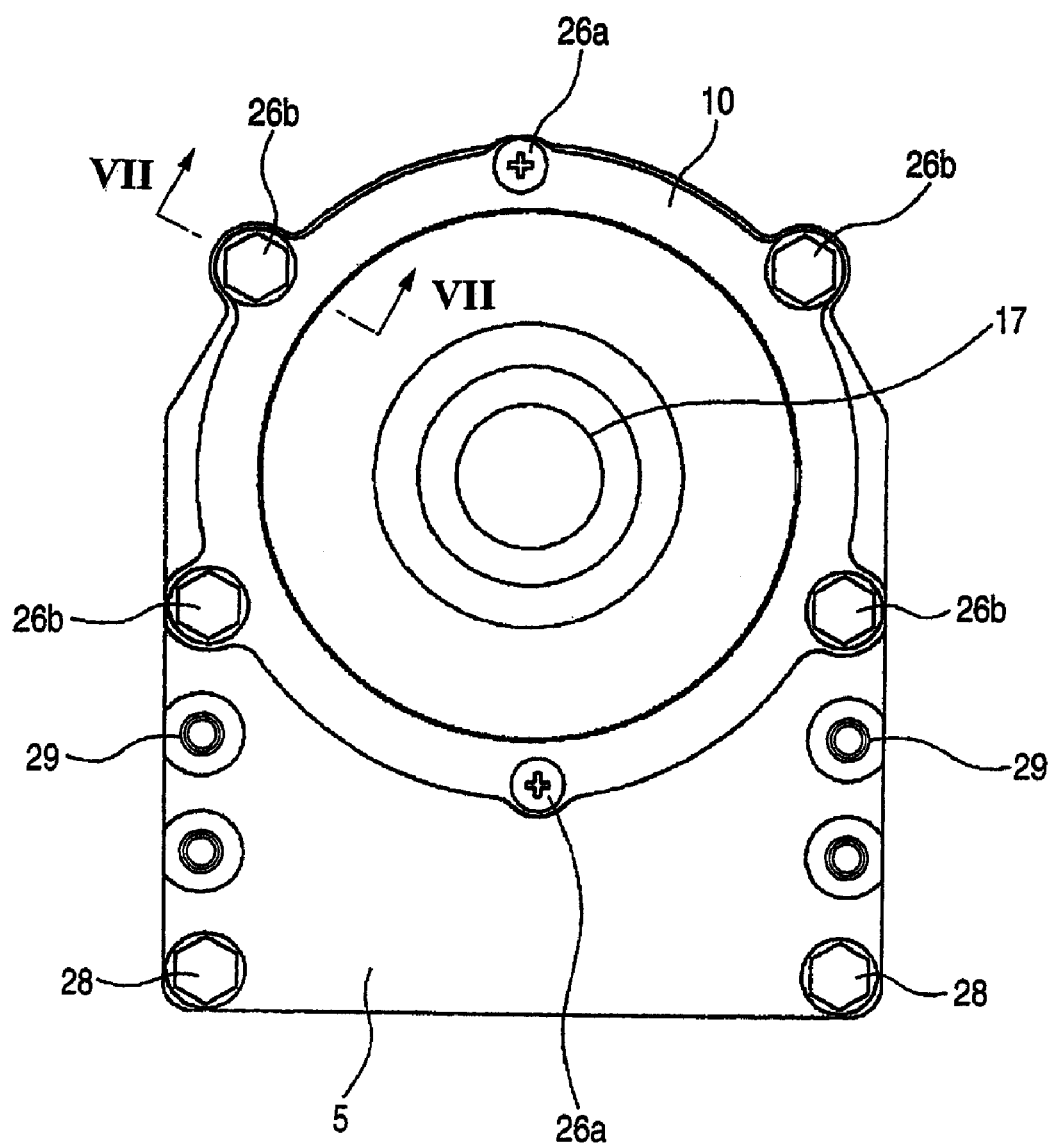
FIG. 3 is a side view of a motor according to the embodiment 1 of the invention.
Figure 4:
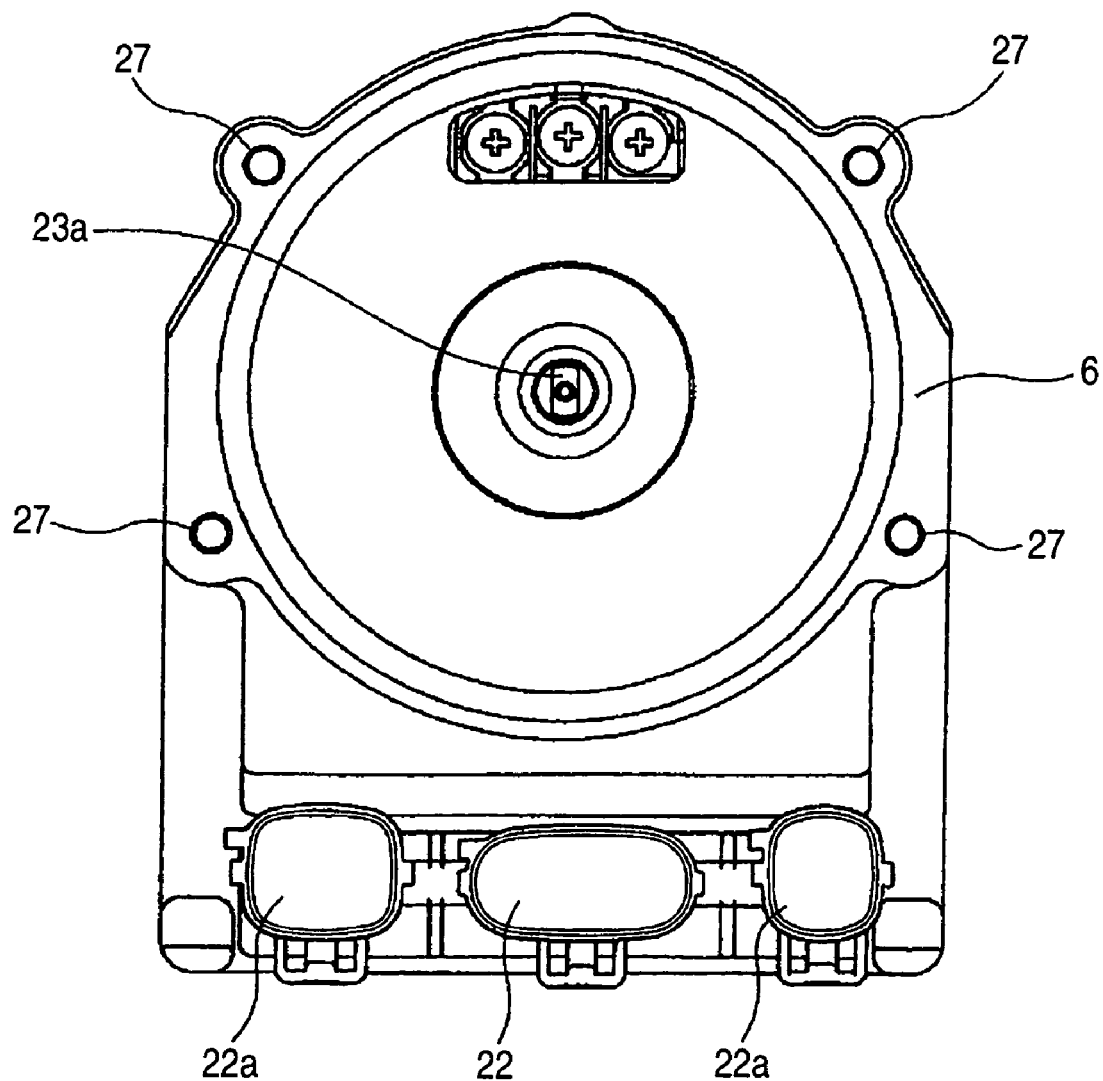
FIG. 4 is a side view of a pump according to the embodiment 1 of the invention.
Figure 5:
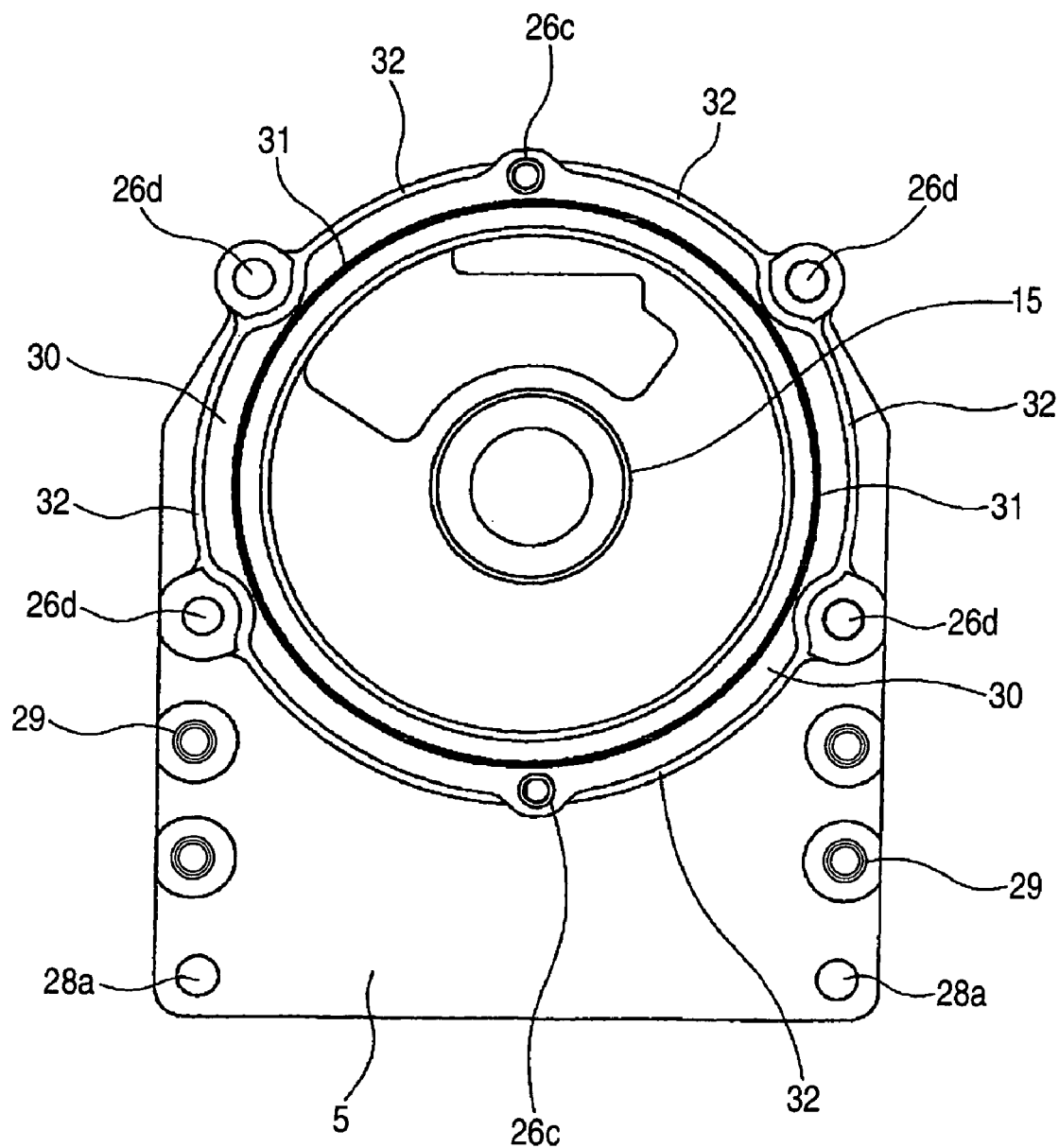
FIG. 5 is a front view of a first housing on the motor side according to the embodiment 1 of the invention.
Figure 6:
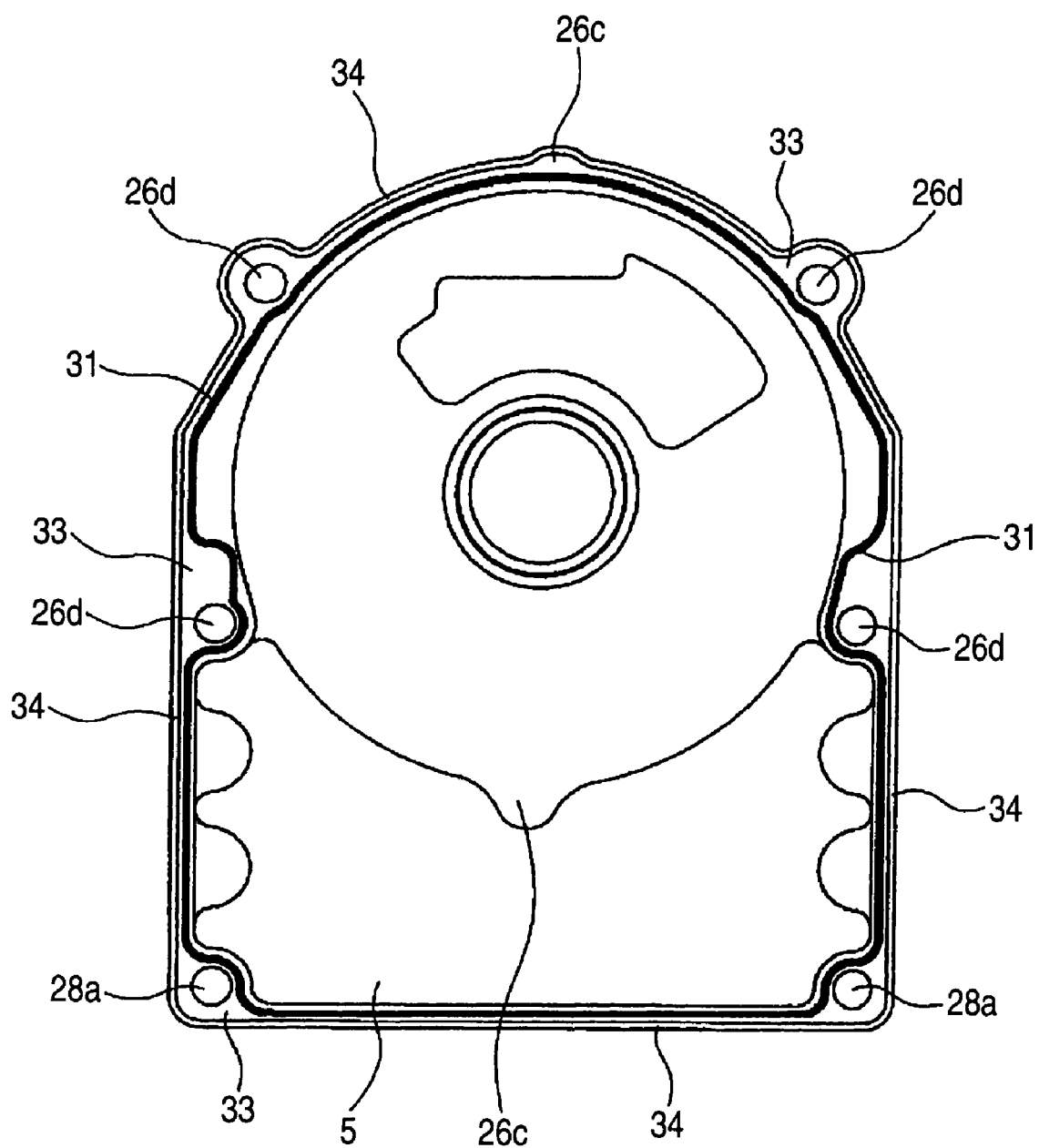
FIG. 6 is a front view of the first housing on the pump side according to the embodiment 1 of the invention.
Figure 7:
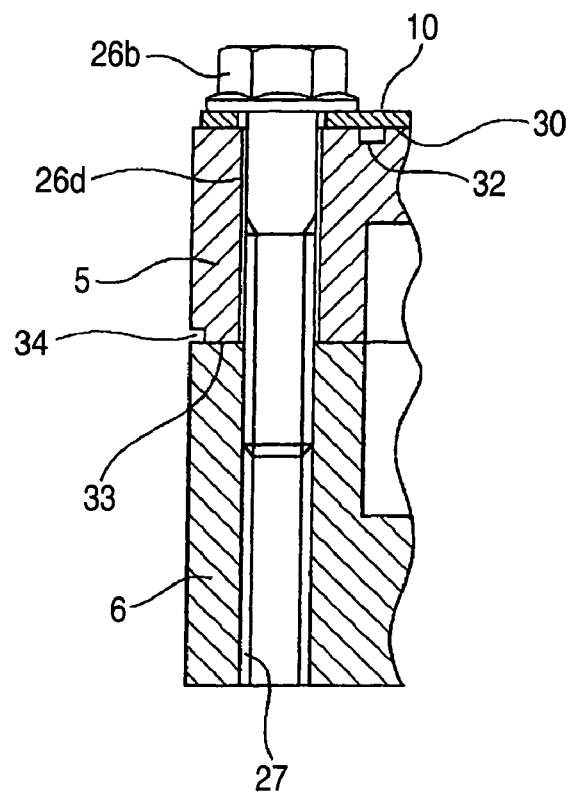
FIG. 7 is a cross-sectional view of the embodiment 1 of the invention taken along the line VII-VII in FIG. 3.

An embodiment 1 of the present invention will be described below with reference to the accompanying drawings. FIG. 1 is a front view showing an electro-hydraulic power steering apparatus. FIG. 2 is a cross-sectional view showing a motor portion and a control device portion as shown in FIG. 1. FIG. 3 is a side view of a motor as shown in FIG. 2. FIG. 4 is a side view of a pump as shown in FIG. 2. FIG. 5 is a front view of a first housing on the motor side. FIG. 6 is a front view of the first housing on the pump side. Also, FIG. 7 is a cross-sectional view taken along the line VII-VII in FIG. 3. In the figures, the same or like parts are designated by the same numerals.

First of all, referring to FIGS. 1 to 4, the electro-hydraulic power steering apparatus 1 has integrated a motor portion 2, a control device portion 3 and a pump portion 4. A control device 7 is disposed in a space surrounded by one side of a first housing 5 and one side of a second housing 6, a motor 8 is disposed on the other side of the first housing 5, and a pump housing 9 for a pump portion 4 is disposed on the other side of the second housing 6. The first housing 5, the second housing 6 and the pump housing 9 are made from die-cast aluminum. An iron core 12 of a stator 11 having steel plates laminated is press fit into an inner circumferential face of the frame 10 making up an outer shell of the motor 8 made from a steel plate, and a rotor 13 is disposed with a certain clearance from the inner circumferential face of the iron core 12. The first housing 5 is formed integrally with a support portion 15 supporting a first bearing 14 rotatably bearing the rotor 13, the first bearing 14 having an outer ring fixed to the support portion 15. The frame 10 has a receiving portion 17 for receiving a second bearing 16 rotatably bearing the rotor 13 on the hand opposite to the pump.

The iron core 12 of the stator 11 has nine slots 18, a bobbin 19 molded of nylon is mounted with insulation, and a stator coil 20 is wound around the bobbin. A plurality of coil terminals in the stator coil 20 are placed in a predetermined connection (e.g., three phase star connection) via a coil connector 21 disposed on a side portion of the stator 11. A connecting terminal (not shown) extending from the coil connector 21 is connected to the control device 7, which is fed with electric power via a connector 22 from a battery, not shown. The rotor 13 comprises a yoke portion 24 making up an iron core formed integrally around a rotational shaft 23, with a ferrite magnet 25 being bonded onto an outer circumferential face of the yoke portion 24 by an adhesive and magnetized in six poles.

The frame 10 is fixed by two clamp screws 26a (first clamp screws) tightened to the first housing 5. Furthermore, the frame 10 is firmly fixed with the first housing 5 by tightening four clamp screws 26b (first clamp screws) to the threaded portions 27 penetrating through the first housing 5 and provided in the second housing 6. The first clamp screws 26 consist of two clamp screws 26a and four clamp screws 26b. A total of six first clamp screws 26 are disposed around the frame 10 at almost regular pitches. Two second clamp screws 28 for fixing the first housing 5 and the second housing 6 are disposed, whereby the first housing 5 and the second housing 6 are fixed by six clamp screws disposed at almost regular pitches, including the four clamp screws 26b. In this manner, a total of eight clamp screws, consisting of the first clamp screws 26 and the second clamp screws 28, are tightened from the hand of the frame, whereby the motor portion 2 and the control device portion 3 are integrally assembled, making it possible to measure the motor performance. Four tapped holes 29 provided in the first housing 5 are blind holes employed to mount the electro-hydraulic power steering apparatus on the vehicle.

The four clamp screws 26b are tightened to the four threaded portions 27 provided in the second housing 6 from the hand of the frame, and the pump housing 9 is fixed by tightening four third clamp screws 35 to the same four threaded portions 27 from the hand of the pump to further integrate the pump portion 4. The rotational shaft 23 extends from the bearing portion 14 via the control device 7 to the pump portion 4, and comprises an engagement portion 23a for engaging a hydraulic pump to transmit a rotational force of the rotor 13 at one end of the pump. Also, a signal from a steering angle sensor is input into the control device 7 connected via a connector 22a.

FIG. 5 is a front view of the first housing 5, as seen from the hand of the frame. The first housing 5 has the threaded portions 26c (blind holes) tightened by the clamp screws 26a, the through holes 26d penetrated by the clamp screws 26b, and the through holes 28a penetrated by the second clamp screws 28. A liquid silicon-based sealant 31 is coated on an abutment face 30 against which an end face of the frame abuts all over the inner circumference from the positions of the first clamp screws 26, as shown in FIG. 5. A step portion 32 is provided on the outer circumference of the abutment face 30, and has a smaller thickness from the abutment face 30 downwards as shown in FIG. 5.

FIG. 6 is a front view of the first housing 5, as seen from the hand of the second housing 6. The first housing 5 has the through holes 26d penetrated by the clamp screws 26b and the through holes 28a penetrated by the second clamp screws 28. Two opposed threaded portions 26c (blind holes) are located at two upper and lower positions to be advantageous for disposing the control device 7 as shown in FIG. 6, in which an upper threaded portion 26c is located on the outer circumference of the control device 7, and a lower threaded portion 26c is located to dispose the control device 7 between the threaded portion 26c and the second housing 6. The through holes 26d penetrated by the clamp screws 26b and the through holes 28a penetrated by the second clamp screws 28 are disposed at almost regular intervals around the control device 7 not to obstruct the operation of the control device 7. The sealant 31 is coated on an abutment face 33 against which the second housing 6 abuts all over the inner circumference from the positions of the through holes 26d and the through holes 28a. A step portion 34 is provided on the outer circumference of the abutment face 33, and has a smaller thickness from the abutment face 33 downwards as shown in FIG. 6.

FIG. 7 is a cross-sectional view of the essence of the clamp screw 26b as shown in FIG. 3. The sealant 31 overflowing the abutment face 30 and the abutment face 33 among the coating sealant 31 is received in the step portion 32 and the step portion 34. The threaded portion 27 has a thread length capable of avoiding contact between the clamp screw 26b and the third clamp screw 35 when the pump housing 9 is fixed by tightening the third clamp screws 35 from the hand of the pump. Thereby, the threaded portion 27 is shared between the clamp screw 26b and the third clamp screw 35.

The operation of the embodiment 1 as configured above will be described below. The control device 7 energizes the stator coil 20 in accordance with a signal from the steering angle sensor, so that the rotational shaft 23 is rotated owing to an electromagnetic action with the magnet 25 provided in the rotor 13 to cause a hydraulic pump in the pump portion 4 to be driven via the engagement portion 23a by its rotational force, whereby the driver is assisted with a steering force by its hydraulic pressure. The electro-hydraulic power steering apparatus 1 is water proof, and has the motor specifications of 12V, 80 A and an idling speed of about 5000 r/min. It is particularly required that the motor is excellent in the safety, accelerating ability and silence, has small size and high performance, and is inexpensive.

In the electro-hydraulic power steering apparatus as configured above, the control device 7 is disposed in a space surrounded by one side of the first housing 5 and one side of the second housing 6, the motor 8 is disposed on the other side of the first housing 5, and the pump 4 is disposed on the other side of the second housing 6, in which the control device portion 3, the motor portion 2 and the pump portion 4 are integrated. The first housing 5 has the support portion 15 for supporting the first bearing 14 of the rotor 13 for the motor 8. There are provided the first clamp screws 26 for securing the frame 10 made of iron and making up an outer shell of the motor 8 to the first housing 5, the frame having the receiving portion 17 for receiving the second bearing 16 of the rotor 13, the iron core 12 of the stator 11 for the motor 8 being press fit into the inner circumferential face of the frame, and the second clamp screws 28 for securing the first housing 5 and the second housing 6. Thereby, the first clamp screws 26 and the second clamp screws 28 are tightened from the hand of the frame 10. Accordingly, the intermediate bracket is unnecessary, the tightening of screws occurs in the same direction, the assembling is excellent, the frame 10, the first housing 5 and the second housing 6 are fastened together, the number of screws is reduced, and the frame is firmly fixed, whereby the cheap and small apparatus is produced.

Moreover, since the iron core 12 made of iron is press fit into the inner circumferential face of the frame 10, the iron core is unlikely to be shaky due to a difference in the thermal expansion coefficient, and the stator 11 of the motor 8 is firmly fixed, whereby the high performance apparatus with low noise is obtained. Also, the frame 10, made of iron, has the high strength and excellent magnetic characteristics, and is of small size and easily installed to provide the high performance apparatus, whereby the constitution is suitable for the electro-hydraulic power steering apparatus 1 integrated.

Also, a plurality of first clamp screws 26 are disposed, part of them being tightened to the first housing 5 and the remainder being tightened to the threaded portions 27 provided in the second housing 6, whereby the number of parts is smaller, and the assembling is excellent. Moreover, since the frame 10, the first housing 5 and the second housing 6 are firmly fixed, there is the effect that the apparatus has less noise and is improved in the vibration resistance and the water proofing. It is effective that five or more first clamp screws 26 are disposed at almost regular intervals.

Also, six first clamp screws 26 are disposed at almost regular intervals, two of them being tightened to the first housing 5 and the remaining four screws being tightened to the threaded portions 27 provided in the second housing 6, whereby the screws are effectively disposed, the space for disposing the control device 7 is effectively secured, the apparatus is of small size, the number of parts is reduced, and the assembling of the first clamp screws 26 is excellent. Since the threaded portions 26c are blind holes, and the clamp screws 26b and the second clamp screws 28 are disposed around the control device 7, the control device 7 is easily disposed, whereby the apparatus of small size is obtained. Moreover, since the frame 10 is fixed uniformly and firmly, the noise is reduced, and the vibration resistance is improved, whereby the constitution is suitable for the electro-hydraulic power steering apparatus 1 integrated.

Though the clamp screws 26b of the first clamp screws 26 provided in the second housing 6 are tightened in the threaded portions 27, the pump housing 9 is fastened to the threaded portions 27 by tightening the third clamp screws 35 from the hand of the pump. Therefore, the screws are shared, the apparatus is of small size and cheap, and the assembling is excellent, whereby the constitution is suitable for the electro-hydraulic power steering apparatus 1 integrated.

Also, the sealant 31 is coated on the abutment face 33 between the first housing 5 and the second housing 6, and on the abutment face 30 between the first housing 5 and the frame 10 to be tightened by the first clamp screws 26 and the second clamp screws 28, whereby the water proofing is easily made, the assembling is excellent, and the mechanization of assembly is easily practiced. Unlike the constitution of disposing the O-rings for water proofing on the abutment faces 30 and 33, it is unnecessary to provide the O-rings, as well as grooving and assembling them, whereby the apparatus is of small size and cheap, and excellent in the assembling and water proofing. Particularly, since the sealant 31 is coated on the abutment faces 30 and 33, there is less vibration transmitted from the motor 8 to the first housing 5 or the second housing 6, or from the pump, as compared with when employing the O-rings, so that the noise is reduced. Also, heat generated from the switching elements of the control device 7 or the stator coil 20 is efficiently conducted to the first housing 5, the second housing 6 and the pump housing 9 to suppress the temperature elevation, whereby the apparatus is made smaller. Thereby, there is more effect for the electro-hydraulic power steering apparatus 1 integrated. Particularly, the sealant 31 having strong adhesion is employed to increase the rigidity, and enhance the noise reduction effect.

Also, since the step portions 32 and 34 are provided on the outer circumference of the abutment faces 30 and 33, the overflowing sealant 31 is reserved in the step portions 32 and 34 and unlikely to overflow the outer circumferential face, whereby there is no need for wiping the sealant 31, and the assembling is excellent. Since the sealant 31 is held on the step portions 32 and 34, the apparatus is excellent in the water proofing and thermal conduction, whereby the constitution is suitable for the electro-hydraulic power steering apparatus 1 integrated.

Embodiment 2

Figure 8:
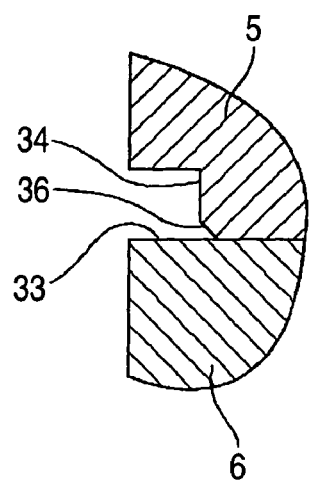
FIG. 8 is a partial cross-sectional view near a step portion according to an embodiment 2 of the invention.

FIG. 8 is a partial cross-sectional view near a step portion according to an embodiment 2 of the invention. In FIG. 8, a step portion 34 is provided on the abutment face 33 between the first housing 5 and the second housing 6, and a chamfer 36 is provided on the step portion 34. Other constitution is the same as in the embodiment 1.

The embodiment 2 is configured in the above manner, whereby there is the same effect as in the embodiment 1. Particularly, since the chamfer 36 is provided on the step portion 34, the sealant 31 is held on the chamfer 35 to improve the water proofing and made stable, even when the sealant overflows only by a small amount. Since the overflowing sealant 31 is not peeled or cut down at the corner portion, there is the effect that the assembling is excellent, and the water proofing is stable over the long time.

As described above, with this invention, there is provided an electro-hydraulic power steering apparatus comprising a control device disposed in a space surrounded by one side of a first housing and one side of a second housing, a motor disposed on the other side of the first housing, and a pump disposed on the other side of the second housing, in which the control device, the motor and the pump are integrated, characterized in that the first housing has a support portion for supporting a first bearing of a rotor for the motor, a first clamp screw for securing a frame made of iron and making up an outer shell of the motor to the first housing, the frame having an iron core of a stator for the motor press fit into an inner circumferential face thereof and having a receiving portion for receiving a second bearing of the rotor, and a second clamp screw for securing the first housing and the second housing, wherein the first clamp screw and the second clamp screw are tightened from the hand of the frame. Therefore, the apparatus is easily assembled with the stator of the motor firmly fixed, excellent in the water proofing and performance, and of small size, in which the motor, the control device and the pump are integrated, whereby the constitution is suitable for the electro-hydraulic power steering apparatus.

What is claimed is:

1. An electro-hydraulic power steering apparatus comprising:
   a first housing having a support portion;
   a second housing fixed to the first housing;
   a control device disposed in a space surrounded by a side of the first housing and a side of the second housing;
   a motor disposed on another side of the first housing, the motor including a rotor, a stator and a frame, the rotor having a first bearing supported by the support portion and a second bearing, the stator having an iron core, the frame made of iron and making up an outer shell of the motor, the frame including an inner circumferential face into which the iron core is press fitted and a receiving portion which receives the second bearing;

a pump disposed on another side of the second housing;

a plurality of first clamp screws for securing the frame to the first housing; and a second clamp screw for securing the first housing and the second housing;

wherein the control device, the motor and the pump are integrated;

the first clamp screw and the second clamp screw are tightened from a motor side of the steering apparatus;

the first housing includes first threaded portions each having a blind hole;

the second housing includes second threaded portions;

a part of the plurality of first clamp screws are tightened to the blind holes of the first threaded portions, and the remainder are tightened to the second threaded portions; and the control device is disposed between the first threaded portion and the second housing.

2. The electro-hydraulic power steering apparatus according to claim 1, wherein the plurality of first clamp screws includes six first clamp screws disposed at substantially regular intervals;

two of the six first clamp screws are tightened to the first housing; and the remaining four screws are tightened to the second threaded portions.

3. The electro-hydraulic power steering apparatus according to claim 1, wherein the pump has a pump housing fixed by tightening a third clamp screw to the threaded portion from a pump side of the steering apparatus.

4. The electro-hydraulic power steering apparatus according to claim 1, wherein a sealant is coated on an abutment face between the first housing and the second housing and an abutment face between the first housing and the frame.

5. The electro-hydraulic power steering apparatus according to claim 4, wherein at least one of the abutment face between the first housing and the second housing and the abutment face between the first housing and the frame has an outer circumference on which a step portion is provided.

6. The electro-hydraulic power steering apparatus according to claim 5, wherein the step portion is provided with a chamfer.

7. The electro-hydraulic power steering apparatus according to claim 1, wherein both the first clamp screw and the second clamp screw are accessible from outside of the first housing and the second housing.

8. The electro-hydraulic power steering apparatus according to claim 3, wherein the third clamp screw is accessible from outside of the second housing and is screwed into the second housing in a direction towards the motor.

9. The electro-hydraulic power steering apparatus according to claim 1, wherein the pump is disposed distal to the motor.

10. The electro-hydraulic power steering apparatus according to claim 1, wherein the second clamp screw is disposed further from the motor than the first clamp screw.

11. The electro-hydraulic power steering apparatus according to claim 1, wherein the first clamp screw is screwed into the frame and the first housing in the same axial direction that the second clamp screw is screwed into the first housing and the second housing.

* * * * *